United States Patent
Hellenbrand et al.

(10) Patent No.: US 10,266,342 B2
(45) Date of Patent: Apr. 23, 2019

(54) DEVICE AND METHOD FOR DELIVERING A PIECE GOOD

(71) Applicant: CareFusion Germany 326 GmbH, Kelberg (DE)

(72) Inventors: Christoph Hellenbrand, Kaifenheim (DE); Dietmar Gross, Kelberg (DE); Stephan Johann Brokonier, Neroth (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 0 days.

(21) Appl. No.: 15/651,913

(22) Filed: Jul. 17, 2017

(65) Prior Publication Data

US 2017/0313515 A1 Nov. 2, 2017

Related U.S. Application Data

(63) Continuation of application No. 14/835,532, filed on Aug. 25, 2015, now Pat. No. 9,708,123.

(51) Int. Cl.
*B65G 1/08* (2006.01)
*B65G 47/88* (2006.01)

(52) U.S. Cl.
CPC ........... *B65G 1/08* (2013.01); *B65G 47/8815* (2013.01); *B65G 2205/04* (2013.01)

(58) Field of Classification Search
CPC ... B65G 1/08; B65G 47/8815; B65G 2205/04

(Continued)

(56) References Cited

U.S. PATENT DOCUMENTS 1,841,926 A * 1/1932 Zuehl ......................... A47F 1/08
211/59.2
2,784,872 A * 3/1957 Lux .......................... G07F 11/38
194/282

(Continued)

FOREIGN PATENT DOCUMENTS

CN 202529525 U 11/2012
CN 102975889 A 3/2013

(Continued)

OTHER PUBLICATIONS

Extended European Search Report and Opinion for Application No. 15182277.2, dated Mar. 1, 2016, 7 pages excluding machine translation.

*Primary Examiner* — Rakesh Kumar
(74) *Attorney, Agent, or Firm* — Morgan Lewis & Bockius LLP

(57) ABSTRACT

A release device may include a lifting and pre-stopping element having an upper sliding surface, the part coupled to a drive such that the sliding surface is movable over the sliding plane into an enabled position and at the level of the sliding plane into a blocked position, the part having a stop which in the enabled position protrudes beyond the sliding plane. A blocking element, behind the part in the sliding direction, has an upper blocking element sliding surface, a blocking edge protruding beyond the sliding plane, and an extendable/retractable block coupled to the drive such that the block is movable below the blocking element sliding surface into an enabled position and above the blocking element sliding surface into a blocked position. The blocking edge may be in front of the block in the sliding direction, preventing contact between the piece good and the block in the blocked position.

18 Claims, 7 Drawing Sheets

(58) Field of Classification Search
USPC ... 221/253, 3, 192, 263, 123, 232, 254, 176, 221/179, 282
See application file for complete search history.

(56) References Cited

U.S. PATENT DOCUMENTS

| | | | | |
|---|---|---|---|---|
| 3,318,455 A | | 5/1967 | Takahashi | |
| 3,348,733 A | * | 10/1967 | Johnson | G07F 11/34 221/129 |
| 3,602,403 A | * | 8/1971 | Klem | G07F 11/28 222/251 |
| 3,788,516 A | | 1/1974 | Knickerbocker | |
| 4,018,100 A | * | 4/1977 | Moe | G05G 13/02 194/219 |
| 4,190,179 A | * | 2/1980 | Moss | G07F 11/30 221/299 |
| 4,269,325 A | * | 5/1981 | Durham | G07F 11/30 221/194 |
| 4,371,093 A | * | 2/1983 | Berger | G07F 11/06 221/241 |
| 4,405,059 A | * | 9/1983 | Kull | B65G 1/08 221/129 |
| 4,887,737 A | * | 12/1989 | Adenau | A47F 1/126 221/3 |
| 4,917,264 A | * | 4/1990 | Gasiel | G07F 11/24 193/27 |
| 5,263,596 A | * | 11/1993 | Williams | G07F 17/0092 221/153 |
| 5,269,597 A | * | 12/1993 | Yenglin | A47F 3/02 312/138.1 |
| 5,375,737 A | * | 12/1994 | Ficken | G07F 5/26 109/48 |
| 5,397,025 A | * | 3/1995 | Lee | B65G 59/066 221/194 |
| 6,691,891 B2 | * | 2/2004 | Maldonado | A47F 1/125 211/59.3 |
| 2005/0029283 A1 | * | 2/2005 | Pedigo | G07F 11/24 221/289 |
| 2005/0189369 A1 | * | 9/2005 | Vlastakis | A47F 1/126 221/123 |
| 2007/0221679 A1 | * | 9/2007 | Chandler | G07F 11/16 221/15 |
| 2009/0101614 A1 | * | 4/2009 | Kirschner | G07F 11/16 211/144 |

FOREIGN PATENT DOCUMENTS

| | | |
|---|---|---|
| CN | 103144897 A | 6/2013 |
| CN | 203153177 U | 8/2013 |
| DE | 3244698 A1 | 6/1983 |
| EP | 2404589 A1 | 1/2012 |
| EP | 2628475 A1 | 8/2013 |
| JP | 2008119069 A | 5/2008 |
| KR | 100240772 B1 | 1/2000 |

* cited by examiner

DEVICE AND METHOD FOR DELIVERING A PIECE GOOD

CROSS-REFERENCES TO RELATED APPLICATIONS

This application is a continuation of U.S. patent application Ser. No. 14/835,532, filed on Aug. 25, 2015, entitled "DEVICE AND METHOD FOR DELIVERING A PIECE GOOD," which issued as U.S. Pat. No. 9,708,123, on Jul. 18, 2017, the disclosure of which is incorporated herein by reference in its entirety for all purposes.

TECHNICAL FIELD

The present disclosure relates to a release device for enabling and blocking delivery of a piece good from an inclined storage chute, and a method for delivering a piece good from such a storage chute.

BACKGROUND

Release devices are used in storage bays having a plurality of inclined storage chutes. The inclined storage chutes each contain a plurality of piece goods situated one behind the other in the longitudinal direction of the storage chute. In some release devices, the weight of the piece good is limited below a certain threshold, as subsequently sliding piece goods that are too heavy may damage the device.

The release device is situated at a delivery end of the storage chute and includes a block for holding the piece goods in the storage chute. As soon as the block is moved into the "enabled position," one or more piece goods are delivered from the storage chute. When this takes place in inclined storage chutes, one or more piece goods slip or slide from the storage chute due to gravity, the inclination of the storage chute determining the sliding direction.

An example of a storage facility for storing pharmaceutical packages in inclined storage chutes is described in WO 03/010073 A1. An example of a release device for enabling or blocking the delivery of at least one piece good is described in EP 1 803 663 A1. The release device described is used in picking devices, employed in pharmacies or hospitals, for automatically retrieving pharmaceutical packages. In the above-mentioned release device description, a block is moved over a drive situated below a storage chute, or is moved below the storage chute base, to enable or block delivery from the storage chute.

SUMMARY

The disclosed embodiments provide a release device that can be reliably used with large and/or heavy piece goods. A disadvantage of the release devices mentioned in the publications above is that, due to the design of the block, only piece goods having a relatively low weight can be used, as the block may be damaged when it is struck by a subsequent piece good, which is not to be retrieved. Another disadvantage is that for relatively tall or long piece goods, the block must likewise have a relatively tall or long design in order to prevent a subsequent piece good, which is not to be retrieved, from rolling over at or on the block.

According to an embodiment, a release device may be provided for enabling and blocking delivery of a piece good from an inclined storage chute having a storage chute base and a delivery end, where the storage chute base defines a sliding plane, and piece goods are able to move from the storage chute in a sliding direction along the longitudinal direction of the storage chute, the release device including a drive, a lifting and pre-stopping element having an upper sliding surface, where the lifting and pre-stopping element is coupled to the drive in such a way that the sliding surface is movable over the sliding plane into an enabled position, and is movable at the level of the sliding plane into a blocked position, and where the lifting and pre-stopping element has a stop which in the enabled position protrudes beyond the sliding plane, a blocking element, situated behind the lifting and pre-stopping element in the sliding direction, having an upper blocking element sliding surface, a blocking edge which protrudes beyond the sliding plane, and an extendable and retractable block, wherein the block is coupled to the drive in such a way that the block is movable below the blocking element sliding surface into an enabled position, and is movable above the blocking element sliding surface into a blocked position, where the block is designed in such a way that the blocking edge is provided in front of the block in the sliding direction, so that no contact between the piece good and the block takes place in the blocked position.

The release device according to the present disclosure may be used for enabling and blocking delivery of a piece good from an inclined storage chute, the storage chute having a delivery end, and a storage chute base which defines a sliding plane, on or along which piece goods are able to move from the storage chute in a sliding direction in the longitudinal direction of the storage chute. Multiple inclined storage chutes may be situated next to one another so that multiple storage chute bases likewise define the above-mentioned sliding plane, along or on which the piece goods are able to slip or slide from the storage chutes in the sliding direction as soon as a release device has enabled a storage chute.

The release device, according to embodiments of the present disclosure, includes a drive and a lifting and pre-stopping element, coupled to the drive, having an upper sliding surface, the lifting and pre-stopping element being coupled to the drive in such a way that the sliding surface is movable over the sliding plane defined by the storage chute base(s) into an enabled position, and is movable at the level of the sliding plane into a blocked position. The lifting and pre-stopping element also includes a stop, which in the enabled position, protrudes beyond the sliding plane.

The lifting and pre-stopping element, according to embodiments of the disclosure, is thus movable between two positions, namely, the enabled position and the blocked position. In the enabled position, the sliding surface of the lifting and pre-stopping element is situated above the sliding plane (i.e., a piece good resting partially on the lifting and pre-stopping element in the blocked position is at least partially lifted over the sliding plane when the lifting and pre-stopping element moves). At the same time, when the lifting and pre-stopping element moves beyond the sliding plane into the enabled position, a stop moves over the sliding plane to stop a subsequent piece good situated in the storage chute. The lifting and pre-stopping element thus has two functions: (i) to lift a resting piece good and thus allow the delivery (as discussed below), and (ii) to provide an at least temporary stop or at least a deceleration for a subsequent piece good.

In the blocked position, the piece good to be retrieved rests partially (or completely) on the lifting and pre-stopping element. In some embodiments, to prevent multiple piece goods from being lifted (and retrieved) when the lifting and pre-stopping element moves into the enabled position, the lifting and pre-stopping element is "shorter" than the length of a pharmaceutical package to be retrieved in the retrieval direction (i.e., relative to the longitudinal axis of the release device, the dimension of the piece good in the direction of the longitudinal axis is longer than the length of the lifting and pre-stopping element).

In some embodiments, the release device also includes a blocking element, positioned behind the lifting and pre-stopping element in the sliding direction, the blocking element having an upper blocking element sliding surface, a blocking edge which protrudes beyond the sliding plane, and an extendable and retractable block. The block is coupled to the drive in such a way that the block is movable below the blocking element sliding surface into an enabled position, and is movable above the blocking element sliding surface into a blocked position.

The blocking edge of the blocking element forms the actual hold or stop for the piece goods situated in a storage chute. This blocking edge protrudes beyond the sliding plane (i.e., in the blocked position, in which the sliding surface of the lifting and pre-stopping element is aligned with the sliding plane, the blocking edge forms the actual hold or stop for the piece goods in the storage chute). The blocking edge is part of the blocking element, and is not formed by an element which is movable out of the sliding plane, so that the blocking edge, as an integral part of the blocking element, may have a design that is significantly more compact and stable than would be conceivable for extendable and retractable blocks. The blocking edge may thus be used for stopping/holding larger loads than is possible with other block designs.

According to some embodiments of the present disclosure, the block is designed or situated in such a way that the blocking edge is provided in front of the block in the sliding direction, so that no long-lasting contact between the piece good and the block takes place in the blocked position. As already discussed, movement of the piece goods in the storage chute is stopped by the blocking edge, and not by the block itself. The block is used primarily to prevent rolling over when a piece good strikes the blocking edge.

The use of an immovable blocking edge, which is provided by a stable component and which protrudes beyond the sliding plane, in combination with a height-adjustable lifting and pre-stopping element, ensures that even large, heavy piece goods can be securely and reliably delivered or held. The stop provided for the lifting and pre-stopping element, which in the enabled position is situated above the sliding plane, already provides for "pre-stopping" (or at least deceleration) of the subsequently sliding piece goods, which contributes to the ability to securely handle large, heavy piece goods.

In some other release devices, a continuous sliding plane is provided in the enabled position, so there is a risk that multiple piece goods may "slide through" when a block is not moved quickly enough into the blocked position.

According to the present disclosure, however, a stop or hold, a blocking edge of the blocking element, or a stop of the lifting and pre-stopping element is provided in every position, so that "sliding through" is effectively prevented. In other words, a sliding plane is not required to move quickly into a blocked position in order to restrict piece goods from sliding through.

In addition, it may advantageous that the release device can be enabled without great effort, as the piece goods do not rest against a block.

In contrast to other release devices, in which a block is always moved into the sliding plane, some embodiments of the present disclosure provide a permanent (and thus potentially more stable) blocking edge, which can be overcome only by moving a component (e.g., the lifting and pre-stopping element). This component at the same time can provide a stop for subsequent piece goods. According to the present disclosure, the block, which is normally used for holding piece goods, is utilized primarily as rollover protection, but not for holding piece goods themselves. The combination of the features, as described herein, makes it possible to securely and reliably handle even large, heavy piece goods.

The release device according to embodiments of the present disclosure includes a movable lifting and pre-stopping element and a movable block. Both components are coupled to the drive of the release device in order to trigger the appropriate movements. In one embodiment having a particularly simple design, the release device has a movement converter that is coupled to the drive, the lifting and pre-stopping element, and the block of the blocking element in such a way that when the movement converter moves, the lifting and pre-stopping element and the block are movable at the same time (i.e., the lifting and pre-stopping element as well as the block are movable together with a movement of the drive).

Some embodiments of the release device provide that the movement converter has a three-armed section which is rotatable about an axis. Three arms of the three-armed section are coupled to the lifting and pre-stopping element, the block, and a gear of the drive. Due to the movement converter having a rotatable three-armed section, it is possible, with a rotary motion of the movement converter, to raise or lower the block and simultaneously lower or raise the lifting and pre-stopping element. In some embodiments, it is also possible to adapt the release device to various design sizes by changing the arm lengths.

The release device, according to some embodiments, may be coupled to a control unit of a picking device. The release device receives the command from this control unit to deliver one or more piece goods from the storage chute. However, due to defective piece goods or other unforeseeable sources of error, it may happen that no piece good is delivered from the storage chute when the release device moves into the enabled position. To verify the delivery of a piece good, in some embodiments, the blocking element includes a delivery sensor that detects the delivery of a piece good from a storage chute, the delivery sensor being situated behind the block in the sliding direction.

To simplify the delivery of a piece good, in some embodiments, the block in its upper portion includes a blocking roller. This roller assists with or simplifies the sliding of a piece good over the blocking element. Alternatively or additionally, in some embodiments, it may be provided that for the stop of the lifting and pre-stopping element, which temporarily pre-stops or at least decelerates a subsequent piece good, a stop roller is provided that assists with or simplifies the movement of the subsequent piece good on the lifting and pre-stopping element when the lifting and pre-stopping element moves into the blocked position.

For enhancing or facilitating the sliding or slipping of piece goods over individual components of the release device, in some embodiments, the sliding surface of the lifting and pre-stopping element and/or the blocking element sliding surface have/has a coating with reduced friction resistance.

Some methods are described for delivering a piece good from an inclined storage chute, in which multiple piece goods are situated one behind the other in the sliding direction and which has a storage chute base which defines a sliding plane. Some methods include moving a lifting and pre-stopping element coupled to a drive from a blocked position into an enabled position, a sliding surface of the lifting and pre-stopping element being moved over the sliding plane, with the movement of the lifting and pre-stopping element, lifting a piece good to be delivered which at least partially rests thereon over a blocking edge of a blocking element situated behind the lifting and pre-stopping element in the sliding direction, moving a stop of the lifting and pre-stopping element over the sliding plane and providing a temporary stop for a subsequent piece good, moving a block in the blocking element, which is coupled to the drive below a blocking element sliding surface, and where the piece good to be delivered exits the storage chute via the blocking element sliding surface, and the subsequent piece good is at least temporarily held by the stop of the lifting and pre-stopping element.

In some methods of the present disclosure for delivering a piece good from an inclined storage chute, multiple piece goods are situated thereon, lying one behind the other in the sliding direction, and the storage chute base of the storage chute defines a sliding plane on or along which piece goods slide or slip in the direction of a delivery end of the storage chute.

According to some embodiments described herein, a lifting and pre-stopping element coupled to a drive is moved from a blocked position into an enabled position. During this movement, a sliding surface of the lifting and pre-stopping element is moved over the sliding plane. With the movement of the lifting and pre-stopping element into the enabled position, a piece good to be delivered, which at least partially rests thereon, is lifted over a blocking edge of a blocking element situated behind the lifting and pre-stopping element in the sliding direction. At or near the same time, a stop of the lifting and pre-stopping element is moved over the sliding plane and forms a temporary stop for subsequent piece goods. According to some embodiments, a block in the blocking element, which is coupled to the drive, is moved below a blocking element sliding surface, and the piece good to be delivered then exits the storage chute via the blocking element sliding surface.

For large and/or heavy piece goods, to provide "rollover protection" in addition to the blocking edge, in some embodiments, after the piece good to be delivered is delivered, the lifting and pre-stopping element is moved back into the blocked position, where the sliding surface is aligned with the sliding plane, and upon successful alignment in the sliding direction, the subsequent piece good moves onto the blocking edge, which provides a stop for the piece good, and the block is moved over the blocking element sliding surface, and the piece good is prevented from rolling over when the subsequent piece good strikes the blocking edge.

In one embodiment, it may also be provided that the exiting of the piece good to be delivered may be monitored with a delivery sensor, which is preferably situated behind the block in the sliding direction.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Figure 1:
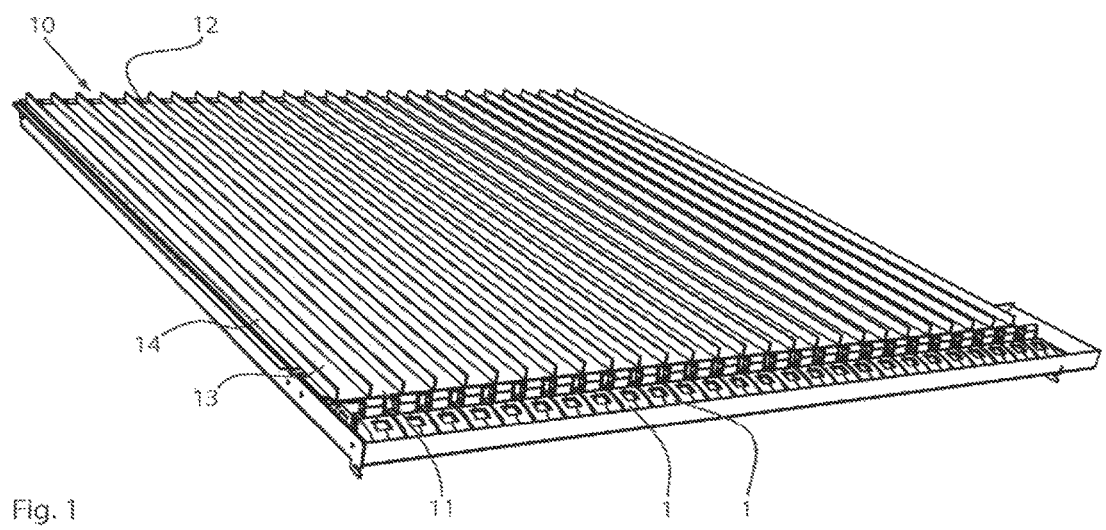
FIG. 1 shows an perspective view of a shelf having a plurality of storage chutes and a plurality of release devices in accordance with certain aspects of the disclosure.

FIG. 1 shows a perspective view of a shelf of a picking device, having a plurality of adjacently situated inclined storage chutes 10, each having a storage end 12 and a delivery end 11. A release device 1 according to the present disclosure is provided for each delivery end 11 of a storage chute 10. The storage chutes 10 are formed in each case by two side walls 14 and a storage chute base 13, the storage chute bases 13 defining a sliding plane along which piece goods slide or slip toward the delivery end or toward the release devices in a sliding direction corresponding to the longitudinal direction or the inclination of the storage chutes. The sliding plane is utilized in the following discussion for simplifying the description of the embodiments, but is not a component of the release device itself. The component(s) corresponding to the sliding plane is/are the storage chute bases.

Figure 2:
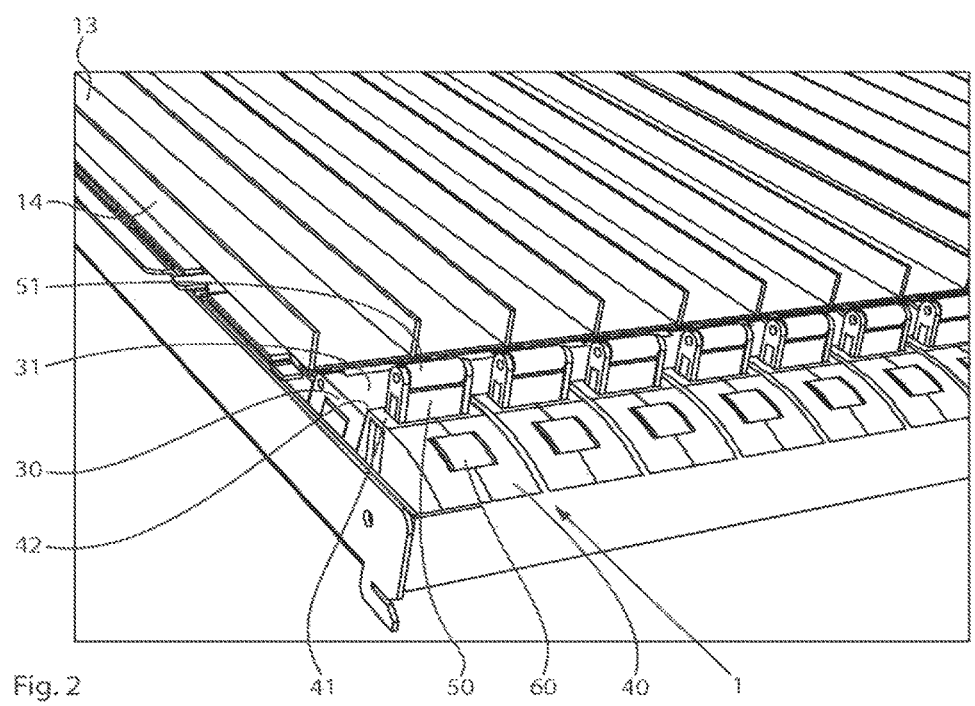
FIG. 2 shows a detailed view of FIG. 1, FIGS. 3A-3D show multiple perspective views of the embodiments of the release device in the enabled position.

FIG. 2 shows a detailed view having a plurality of adjacently situated storage chutes 10, whereby a release device 1 according to the embodiment described here is provided for each delivery end of a storage chute. The release device 1 includes a lifting and pre-stopping element 30 which directly adjoins a chute base 13. This lifting and pre-stopping element 30 includes a sliding surface 31 on which a piece good (not illustrated) would at least partially rest in the shown blocked position of the release device. The sliding surface 31 is in the sliding plane in the blocked position shown.

A blocking element 40 is situated behind the lifting and pre-stopping element 30 in the sliding direction. This blocking element includes a blocking element sliding plane 41 which is "higher" than the sliding plane defined by the storage chute bases, so that as a result of this height difference, the sliding element has a blocking edge 42 which faces the lifting and pre-stopping element. The release device also includes a block 50, which in the position of the release device shown is moved out from the blocking element (i.e., the blocked position of the release device is depicted for all release devices illustrated in FIG. 2). In the embodiments shown in the figures, a blocking roller 51 is situated in the upper section of the block, which simplifies movement of a piece good to be delivered over the block or the blocking element sliding surface.

Figure 3A:
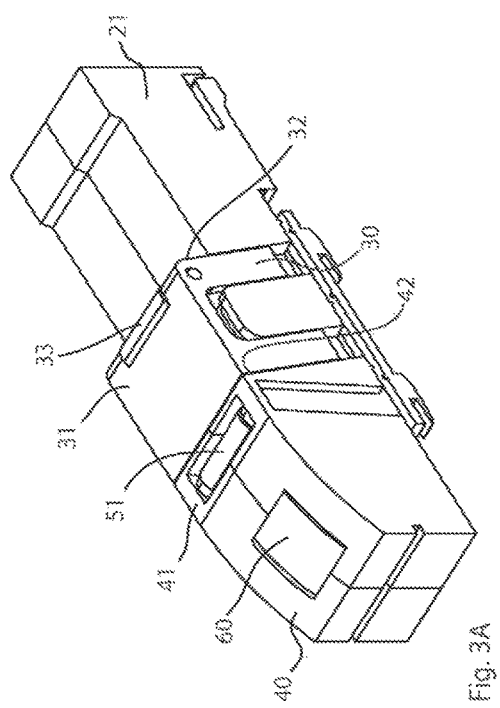
Figure 3B:
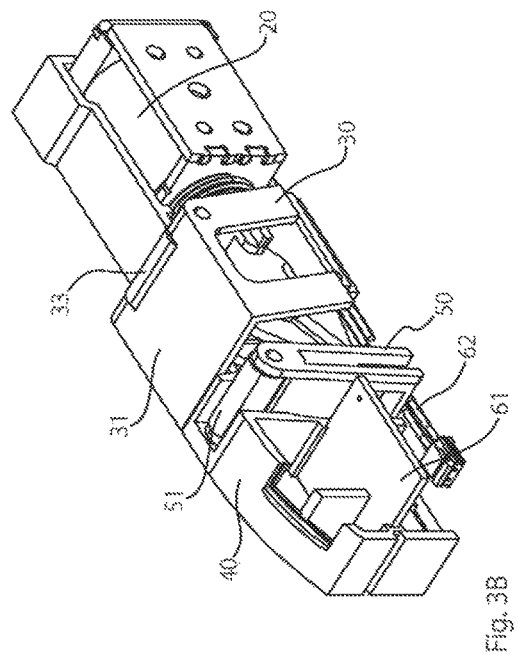
Figure 3C:
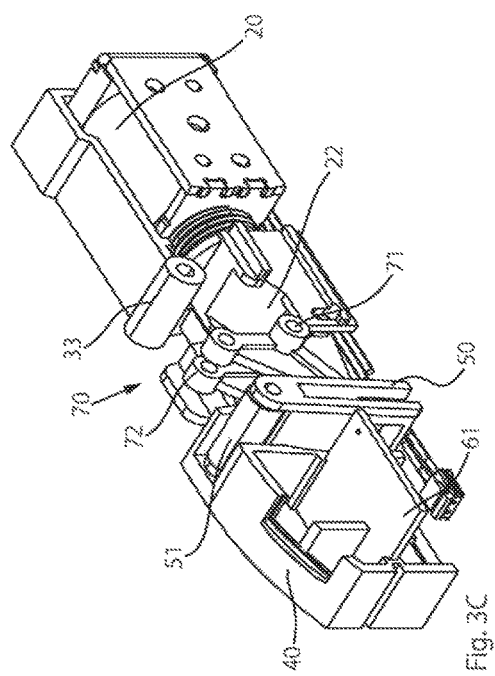
Figure 3D:
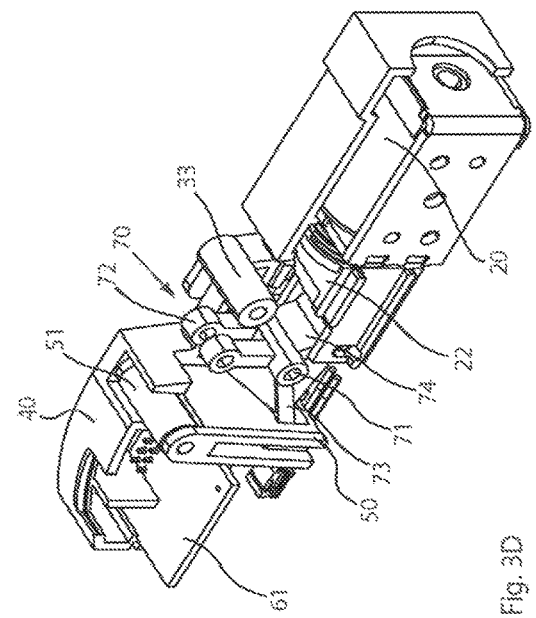

FIGS. 3A-3D show side views of embodiments of the release device according to the present disclosure; various components or portions of components have been omitted in FIGS. 3B-3D in order to show the interior of the release device.

FIG. 3A shows a release device in the enabled position in which the block 50 is completely moved into the blocking element 40, and for the blocking element sliding surface 41 of the blocking element 40, only the blocking roller 51 is discernible. In the enabled position illustrated, the sliding surface 31 of the lifting and pre-stopping element is aligned with the blocking element sliding surface 41, so that a piece good resting on this shared sliding surface 31, 41 can be delivered via the release device; i.e., the piece good slips or slides from the storage chute or the release device along the shared sliding surface 31, 41 due to gravity.

Also apparent in this enabled position is the stop 32 of the lifting and pre-stopping element 30, which halts, stops, or at least slows the movement of a subsequent piece good in the enabled position before the actual stop for the piece goods, and which is described for the subsequent figures. Unintentional "sliding through" of multiple piece goods in the enabled position is thus effectively prevented. A stop roller 33 may be provided that assists with or simplifies the movement of the subsequent piece good on the lifting and pre-stopping element when the lifting and pre-stopping element moves into the blocked position.

A drive housing 21 in which a drive (not illustrated in FIG. 3A) is situated adjoins the lifting and pre-stopping element 30, opposite to the sliding direction. It is also apparent in FIG. 3A that a delivery sensor 60 is situated in the blocking element 40, behind the block 50 in the sliding direction.

Portions of the blocking element 40, of the lifting and pre-stopping element 30, and of the drive housing 21 are omitted in FIG. 3B. A printed circuit board 61 of the delivery sensor 60 is apparent in the blocking element 40, the printed circuit board 61 being connected via lines 62, merely indicated, to a control unit of a picking device in which the release device is used. The block 50, which in the enabled position illustrated is completely retracted into the blocking element, is also discernible in the blocking element 40. The drive 20, which is coupled to the block 50 and to the lifting and pre-stopping element 30 via means, not discernible in this figure, is apparent due to omission of a portion of the drive housing 21.

In the illustration shown in FIG. 3C, the lifting and pre-stopping element 30 is almost completely omitted, allowing a view of the interior of the release device. In the illustrated embodiment, the release device includes a movement converter 70 having a three-armed section which is supported in the release device via an axis 71. Three arms 72, 73, 74 of the three-armed section, of which only one arm 72 is apparent in FIG. 3C, are coupled to the block 50, to the lifting and pre-stopping element 30, and to a gear 22 of the drive 20, in particular in such a way that the block 50 and the lifting and pre-stopping element 30 are moved at the same time by a movement of the drive. Due to the design of the movement converter with the three-armed section, it is ensured that the block is lowered when the lifting and pre-stopping element is raised, and the block itself is raised when the lifting and pre-stopping element is lowered.

FIG. 3D shows a perspective view of embodiments of the release device. In this view, the three arms 72, 73, 74 are apparent, and in particular, the three arms are depicted in the position that they assume in the enabled position of the release device.

FIGS. 4A-4D show views of embodiments comparable to FIGS. 3A-3D, the release device being illustrated in the blocked position in FIGS. 4A-4D. In this blocked position, as is apparent in particular from FIG. 4A, the block 50 moves in sections out of the blocking element 40 and protrudes beyond the blocking element sliding surface 41 of the blocking element. As is likewise apparent in FIG. 4A, the sliding surface 31 of the lifting and pre-stopping element 30 is lowered relative to the enabled position, and is situated "below" a plane formed by the blocking element sliding surface 41. A blocking edge 42 of the blocking element 40 is enabled due to this configuration of the sliding surface 31 of the lifting and pre-stopping element 30, this blocking edge taking over the actual stopping or holding function for the piece goods, as discussed in greater detail below with reference to FIGS. 7A-7C in the description of the method according to an embodiment.

Figure 4C:
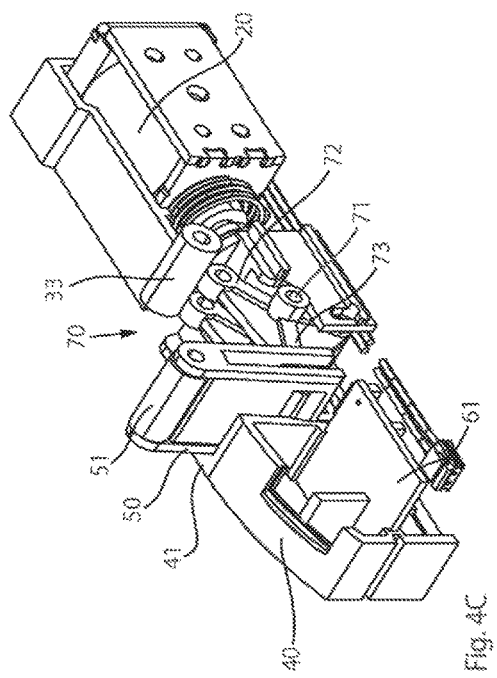
FIGS. 4A-4D show multiple perspective views of embodiments of the release device in the blocked position.
Figure 4D:
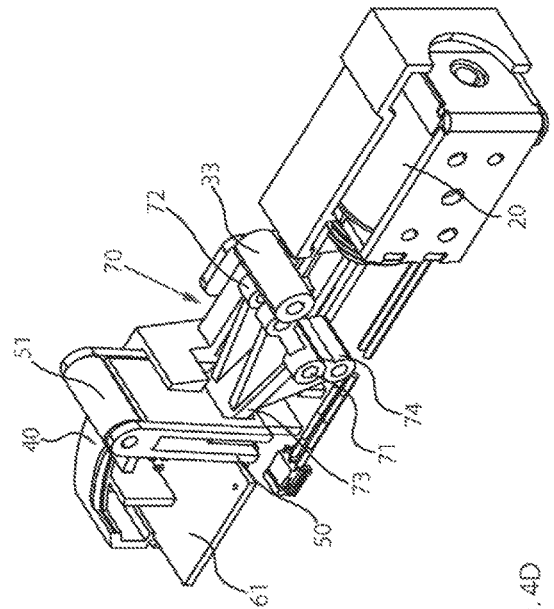
Figure 4A:
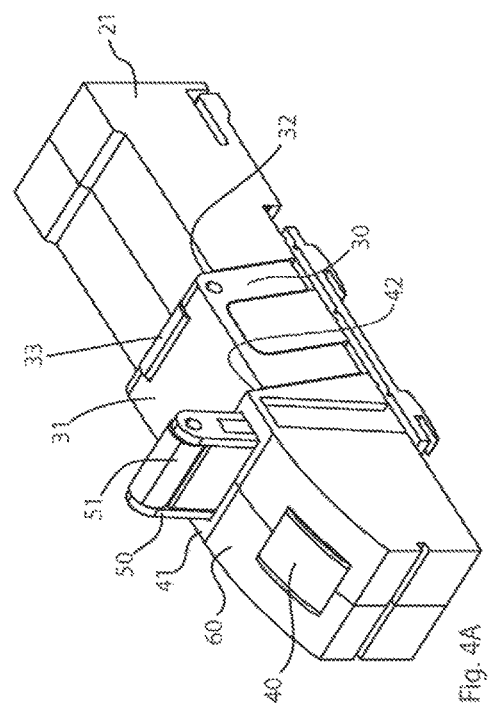
Figure 4B:
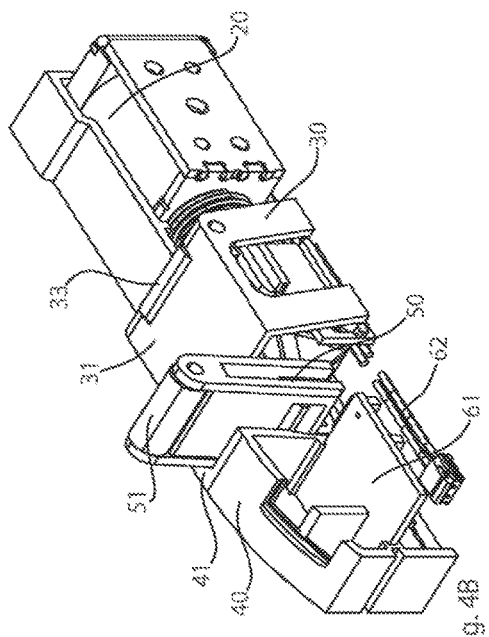

As is apparent in FIGS. 4C and 4D, in the blocked position illustrated, the movement converter 70 is in a different configuration than was the case in FIGS. 3C and 3D. The three arms 72, 73, 74 of the three-armed section are rotated about axis 71 in relation to the above-mentioned illustration, this rotation causing the movement of the block 50 and of the lifting and pre-stopping element 30.

Figure 5A:
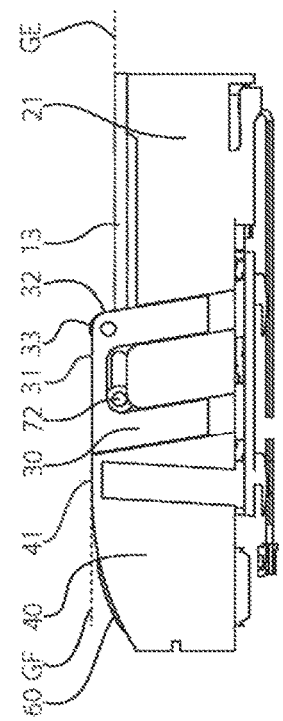
FIGS. 5A and 5B show side views of embodiments in the enabled position.
Figure 5B:
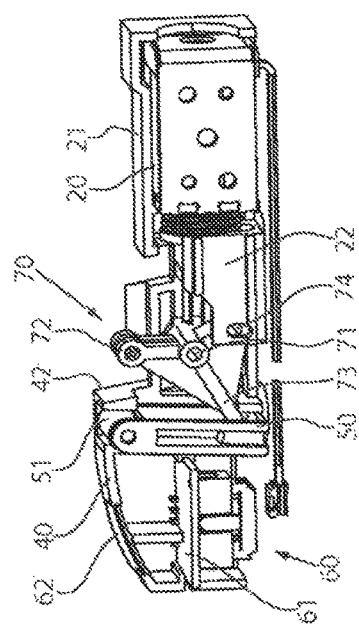

FIGS. 5A and 5B show side views of embodiments in the enabled position, portions of the blocking element 40, and of the lifting and pre-stopping element 30. In FIG. 5B, the drive housing 21 is omitted in order to illustrate components of the release device situated in the interior.

In the left portion of FIG. 5A, the sliding surface 31 of the lifting and pre-stopping element 30 is aligned with the blocking element sliding surface 41, and the two sliding surfaces form a shared sliding surface GF. In the enabled position illustrated, the sliding surface GF of the lifting and pre-stopping element is situated "above" the sliding plane GE, which is defined by the storage chute base 13, and is at the height of the surface of the storage chute bases. As is very apparent in this illustration, the lifting and pre-stopping element 30 includes a stop 32, which in this enabled position of the release device protrudes beyond the sliding plane GE and provides a stop for subsequent piece goods.

FIG. 5B shows once again the position of the three-armed section of the movement converter 70. In this illustration, it is shown that the arm 73 coupled to the block is slightly longer than the two arms 72, 74, which are coupled to the lifting and pre-stopping element and the gear 22.

Figure 6A:
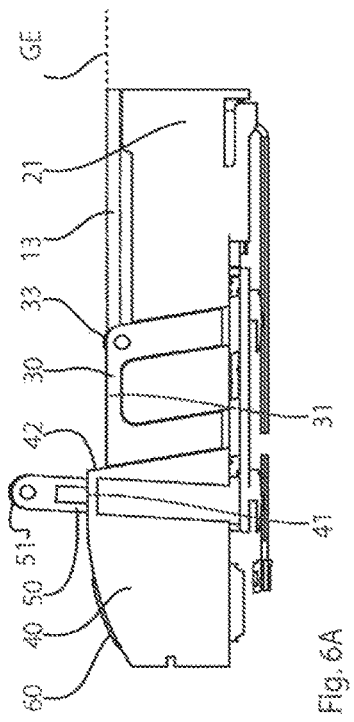
FIGS. 6A and 6B show side views of embodiments in the blocked position.
Figure 6B:
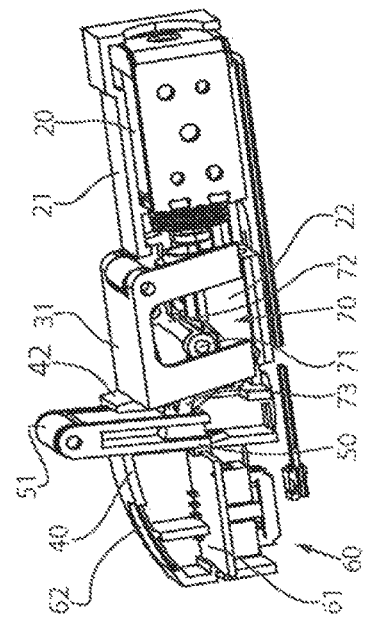

FIGS. 6A and 6B show two side views of embodiments in the blocked position, in which the block 50 is moved over the blocking element sliding surface 41 of the blocking element, and the sliding surface 31 of the lifting and pre-stopping element 30 is aligned with the sliding plane GE defined by the storage chute base 13. In this illustration, it is apparent that the blocking element 40 includes a blocking edge 42. This blocking edge provides the actual stopping or holding function for resting piece goods.

Figure 7A:
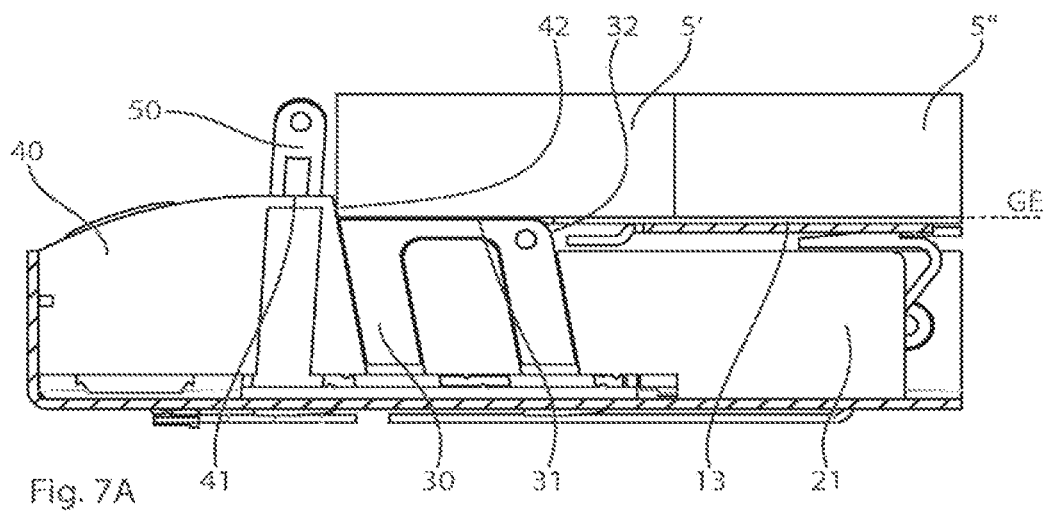
FIGS. 7A-7C show side views of various positions during release of a piece good in accordance with certain aspects of the disclosure.
Figure 7B:
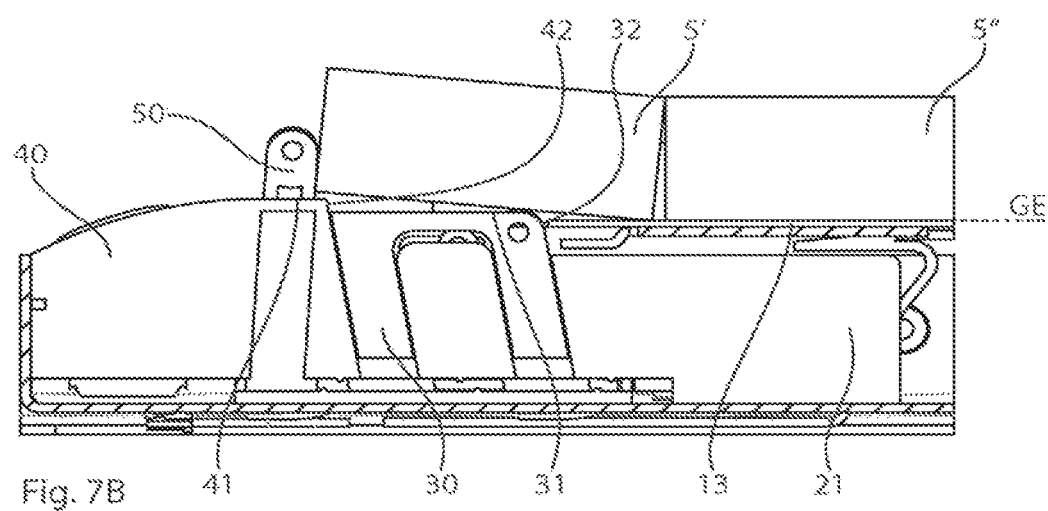
Figure 7C:
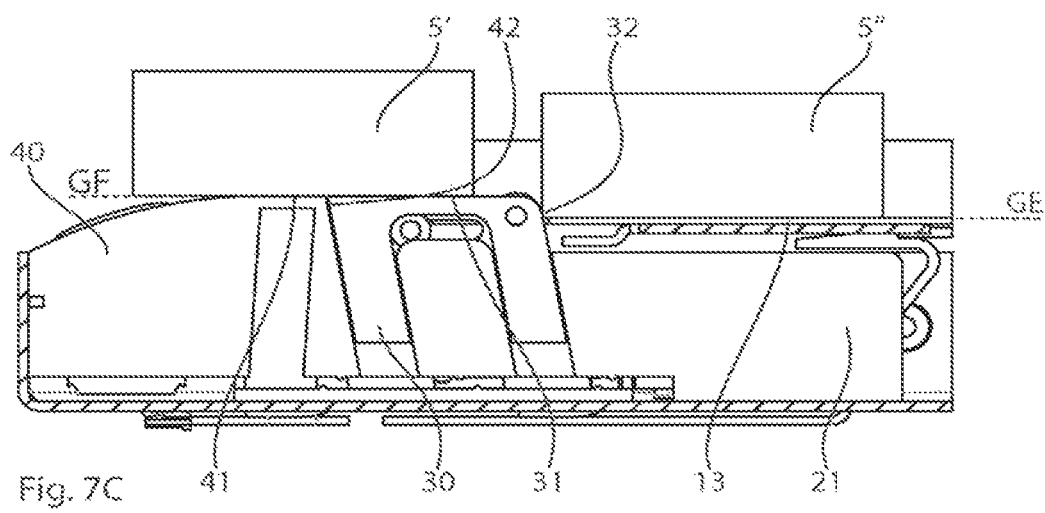

FIGS. 7A-7C show side views of embodiments of the release device, configured with a delivery end of a storage chute, and two piece goods 5', 5" situated in the storage chute. Some methods will be explained below with reference to these illustrations.

The blocked position of the release device is illustrated in FIG. 7A. As is apparent in this illustration, the sliding surface 31 of the lifting and pre-stopping element 30 is aligned with the sliding plane GE defined by the surface of the storage chute base 13. The stop 32 of the lifting and pre-stopping element 30 is situated below the sliding plane GE, and therefore cannot produce a stopping or holding effect in this position of the release device.

As shown in FIG. 7A, the blocking element sliding surface 41 is situated offset and "above" the sliding plane (i.e., the blocking element sliding surface 41 is not aligned with the sliding plane), so that in the blocked position of the release device the blocking edge 42 is situated above the sliding plane, and the movement of the piece goods 5', 5" in the sliding direction (i.e., to the left in the illustration) is prevented. In the illustrated blocked position there is no contact between a piece good 5' to be retrieved and the block 50, and the entire weight or the entire pressure of the piece goods situated in the storage chute is absorbed by the blocking edge 42, which is an integral part of the blocking element 40. As already stated, this allows larger, heavier piece goods to be reliably delivered with the release device according to the present disclosure.

For delivering a piece good from the storage chute, the lifting and pre-stopping element, which is coupled to a drive (not illustrated in FIGS. 7A-7C), is moved from the blocked position illustrated in FIG. 7A into an enabled position. During this movement, the sliding surface 31 of the lifting and pre-stopping element is moved "upwardly" over the sliding plane toward the blocking element sliding surface 41. During this movement of the lifting and pre-stopping element, as indicated in FIG. 7B, a piece good 5' resting at least partially on the lifting and pre-stopping element 30 is lifted over the blocking edge 42 of the blocking element, and the stop 32 of the lifting and pre-stopping element is moved over the sliding plane GE, thus providing a temporary stop (or at least a deceleration) for a subsequent piece good 5" (see FIG. 7C). The block 50, which is coupled to the drive (not illustrated), is moved below the blocking element sliding surface 41 simultaneously with the movement of the lifting and pre-stopping element. When the sliding surface 31 of the lifting and pre-stopping element 30 is aligned with the blocking element sliding surface 41, the piece good to be delivered is output from the storage chute, the subsequent piece good 5" being at least temporarily held by the stop 32 of the lifting and pre-stopping element.

To return to the blocked position from the enabled position, the lifting and pre-stopping element 30 is lowered once again and the block 50 is moved over the blocking element sliding surface. During the movement of the lifting and pre-stopping element, the stop 32 of the component moves increasingly farther in the direction of the sliding plane until ultimately the sliding surface 31 of the lifting and pre-stopping element is aligned with the sliding plane, and the stop 32 no longer produces an effect. In this position, the subsequent component 5" slips or slides to the blocking edge 42, enabled by movement of the lifting and pre-stopping element 30. Due to the configuration of the blocking edge and the block, the movement of the piece good is stopped only by the blocking edge 42, and the block 50 is used solely for preventing a possible rollover of the subsequent piece good 5".

Figure 8:
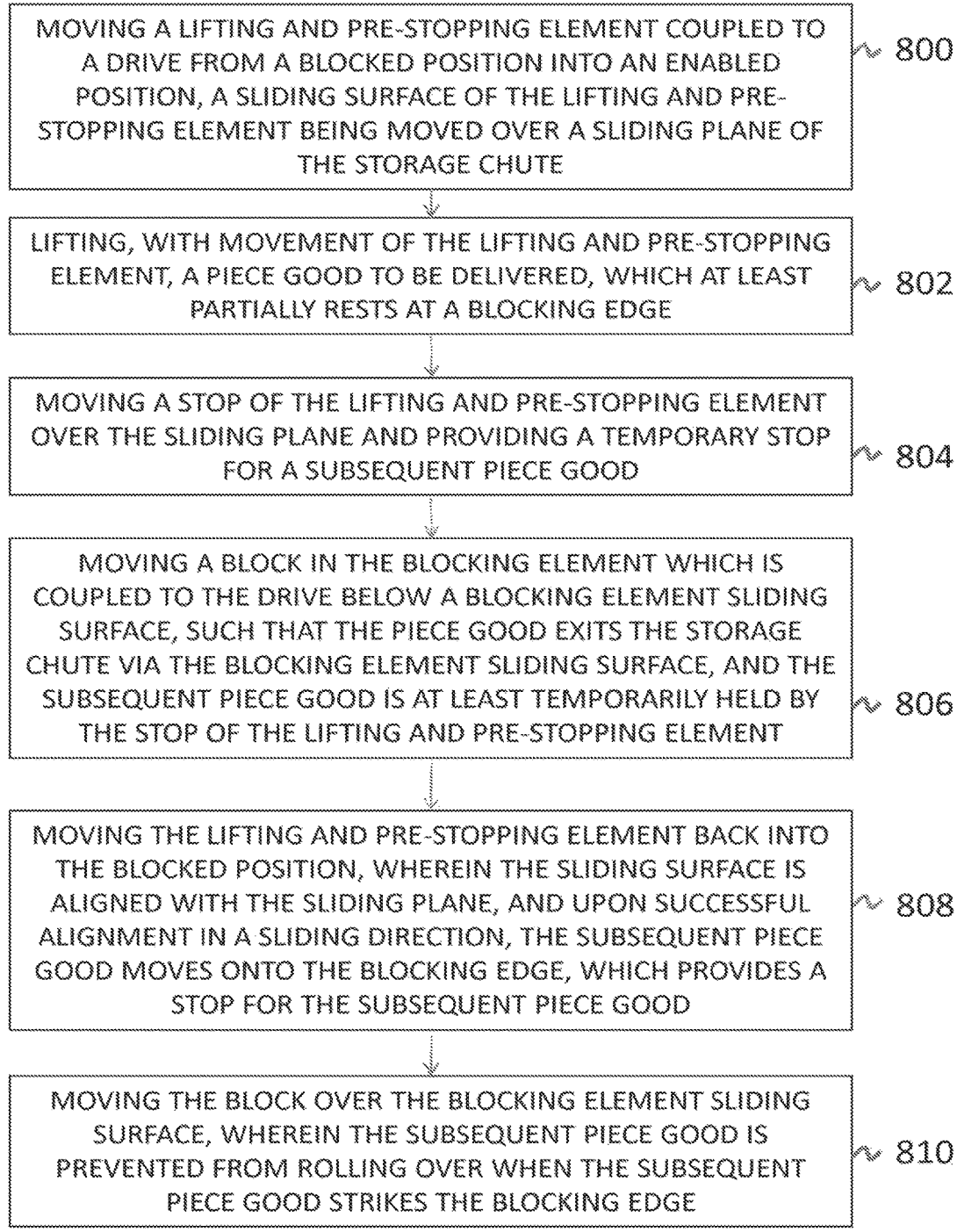
FIG. 8 illustrates a flowchart of example operations that may be performed for operating a release device for delivery of one or more piece goods, in accordance with aspects of the present disclosure.

Illustrative operations that may be performed for operating a release device to deliver one or more piece goods from a storage chute of a picking device are shown in FIG. 8.

At block 800, a lifting and pre-stopping element coupled to a drive is moved from a blocked position into an enabled position. During this movement, a sliding surface of the lifting and pre-stopping element is moved over the sliding plane of the storage chute.

At block 802, with the movement of the lifting and pre-stopping element into the enabled position, a piece good to be delivered, which at least partially rests at a blocking edge, is lifted. The piece good may be lifted over a blocking edge of a blocking element situated behind the lifting and pre-stopping element in the sliding direction.

At block 804, at or near the same time that the piece good is lifted, a stop of the lifting and pre-stopping element is moved over the sliding plane and forms a temporary stop for subsequent piece goods.

At block 806, a block in the blocking element, which is coupled to the drive, is moved below a blocking element sliding surface, and the piece good to be delivered then exits the storage chute via the blocking element sliding surface. The subsequent piece good may be temporarily held by the stop of the lifting and pre-stopping element while the piece good to be delivered exits the storage chute.

At block 808, the lifting and pre-stopping element is moved back into the blocked position, where the sliding surface is aligned with the sliding plane, and upon successful alignment in the sliding direction, the subsequent piece good moves onto the blocking edge, which provides a stop for the subsequent piece good.

At block 810, the block is moved over the blocking element sliding surface, and the subsequent piece good is prevented from rolling over (e.g., over the blocking edge) when the subsequent piece good strikes the blocking edge. In this way, for large and/or heavy piece goods, the block may be raised to provide "rollover protection" in addition to the blocking edge. The operations of block 810 may be after or while the piece good to be delivered is delivered.

In one embodiment, it may also be provided that the exiting of the piece good to be delivered may be monitored with a delivery sensor, which is preferably situated behind the block in the sliding direction.

Figure 9:
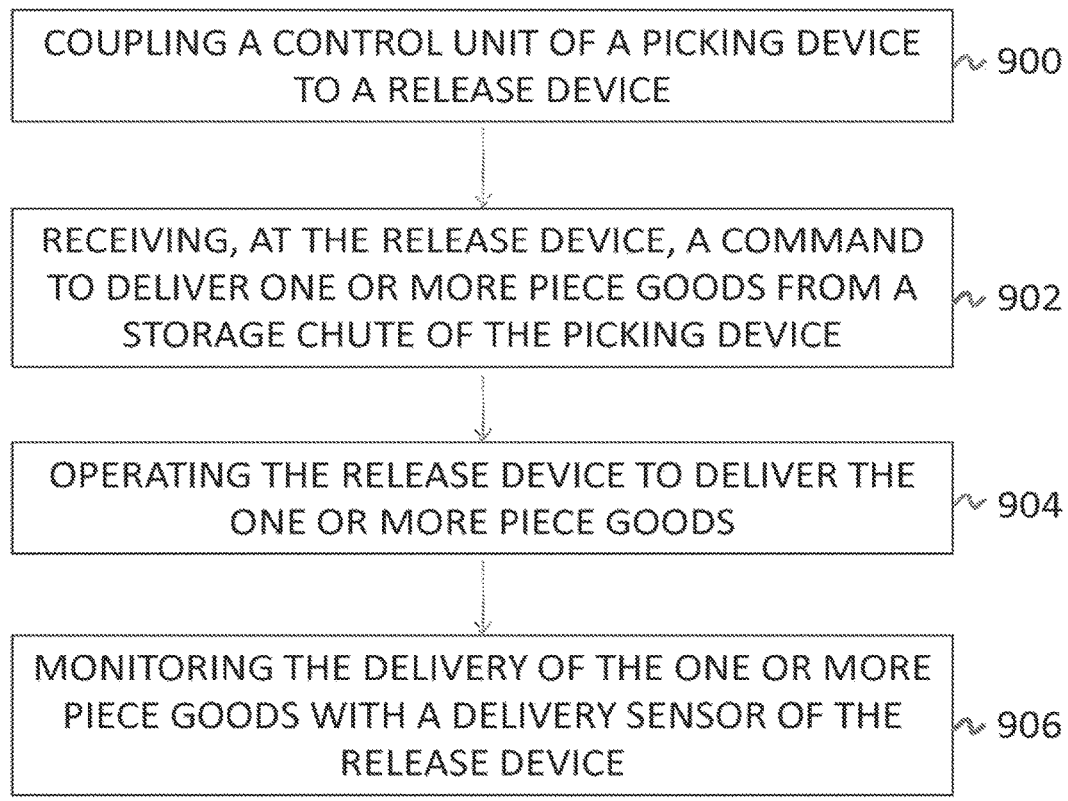
FIG. 9 illustrates a flowchart of example operations that may be performed for operating a picking device having a release device, in accordance with aspects of the present disclosure.

The release device, according to some embodiments, may be coupled to a control unit of a picking device. Illustrative operations that may be performed for operating picking device having a release device are shown in FIG. 9.

At block 900, a control unit of the picking device may be communicatively coupled to the release device.

At block 902, the release device may receive a command from the control unit to deliver one or more piece goods from a storage chute of the picking device.

At block 904, the release device may be operated to deliver the one or more piece goods. Operating the release device may include performing some or all of the operations described above in connection with FIG. 8 or other methods or processes described herein. However, due to defective piece goods or other unforeseeable sources of error, it may happen that no piece good is delivered from the storage chute when the release device moves into the enabled position.

At block 906, to verify the delivery of a piece good, in some embodiments, the delivery of the one or more piece goods may be monitored using a delivery sensor of the release device. For example, as described above, a blocking element of the release device may include a delivery sensor that detects the delivery of a piece good from a storage chute, the delivery sensor being situated behind the block in the sliding direction.

In an embodiment of the present disclosure, a release for delivery of a piece good from an inclined storage chute having a storage chute base that defines a sliding plane may be provided, the release device comprising: a drive; a lifting and pre-stopping element having an upper sliding surface, wherein the lifting and pre-stopping element is coupled to the drive such that that the sliding surface is movable (i) over the sliding plane when the release device is in an enabled position and (ii) at the level of the sliding plane when the release device is in a blocked position, and wherein the lifting and pre-stopping element has a stop, which protrudes beyond the sliding plane when the release device is in the enabled position; and a blocking element, situated behind the lifting and pre-stopping element in a sliding direction, and having an upper blocking element sliding surface, a blocking edge that protrudes beyond the sliding plane when the release device is in the blocked position, and an extendable and retractable block, wherein the block is coupled to the drive such that the block is movable (i) below the blocking element sliding surface when the release device is in the enabled position, and (ii) above the blocking element sliding surface when the release device is in the blocked position.

In some embodiments, the release device may further comprise a movement converter which is coupled to the drive, the lifting and pre-stopping element, and the block of the blocking element in such a way that when the movement converter moves, the lifting and pre-stopping element and the block are movable at the same time. In one or more embodiments, the movement converter has a three-armed section which is rotatable about an axis and which comprise three arms, wherein the three arms of the three-armed section are coupled to the lifting and pre-stopping element, the block, and a gear of the drive.

In some embodiments, the blocking element includes a delivery sensor which detects the delivery of a piece good from a storage chute. In some embodiment, the block has an upper portion that includes a blocking roller. In some embodiments, the release device further comprises a stop roller situated at the stop. In some embodiments, the sliding surface of the lifting and pre-stopping element and/or the blocking element sliding surface have/has a coating with reduced friction resistance. In some embodiments, the blocking edge is provided in front of the block in the sliding direction, so that no contact between the piece good and the block takes place in the blocked position In accordance with an embodiment, a method for delivering a piece good from an inclined storage chute is provided, the method comprising: moving a lifting and pre-stopping element coupled to a drive from a blocked position into an enabled position, a sliding surface of the lifting and pre-stopping element being moved over a sliding plane of the storage chute; lifting, with movement of the lifting and pre-stopping element, a piece good to be delivered, which at least partially rests at a blocking edge; moving a stop of the lifting and pre-stopping element over the sliding plane and providing a temporary stop for a subsequent piece good; and moving a block in the blocking element which is coupled to the drive below a blocking element sliding surface, such that the piece good exits the storage chute via the blocking element sliding surface, and the subsequent piece good is at least temporarily held by the stop of the lifting and pre-stopping element.

One or more methods as provided herein may include, after the piece good to be delivered is delivered: moving the lifting and pre-stopping element back into the blocked position, wherein the sliding surface is aligned with the sliding plane, and upon successful alignment in a sliding direction, the subsequent piece good moves onto the blocking edge, which provides a stop for the subsequent piece good; and moving the block over the blocking element sliding surface, wherein the subsequent piece good is prevented from rolling over when the subsequent piece good strikes the blocking edge.

In various embodiments, the method may include monitoring exiting of the piece good to be delivered with a delivery sensor. In some embodiments, lifting, with movement of the lifting and pre-stopping element, the piece good to be delivered, which at least partially rests at the blocking edge, comprises lifting, with movement of the lifting and pre-stopping element, the piece good to be delivered, which at least partially rests at the blocking edge of a blocking element situated behind the lifting and pre-stopping part in a sliding direction.

In accordance with an embodiment, a release device may be provided, comprising: a blocking element having a blocking edge and a block, wherein the blocking edge is provided in front of the block in a sliding direction of a piece good in a storage chute, so that no contact between the piece good and the block takes place when the release device is in a blocked position; and a lifting and pre-stopping element having a stop configured to provide a temporary stop for a subsequent piece good in the storage chute, when the release device is in an enabled position that allows delivery of the piece good.

In some embodiments, when the release device is in the blocked position, the block is configured to prevent the subsequent piece good from rolling over the blocking edge when the subsequent piece good strikes the blocking edge. In some embodiments, when the release device is in the enabled position, the block is disposed completely within the blocking element. In some embodiments, the block comprises a blocking roller that, when the release device is in the enabled position, forms a portion of a blocking element sliding surface of the blocking element. In some embodiments, the lifting and pre-stopping element is configured to lift the piece good over the blocking edge to allow delivery of the piece good from the storage chute.

In various embodiments, the release device further comprises a drive configured to raise the block while lowering the lifting and pre-stopping element to move the release device from the enabled position to the blocked position. In some embodiments, the drive is further configured to lower the block into the blocking element while raising the lifting and pre-stopping element to move the release device from the blocked position to the enabled position.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A method for delivering a piece good from an inclined storage chute, the method comprising:
moving a release device toward a blocked position comprising, lowering a lifting and pre-stopping element, coupled to a drive, such that an upper sliding surface of the lifting and pre-stopping element is aligned with a sliding plane of the storage chute, and a blocking edge of a blocking element protrudes above the sliding plane, wherein, in the blocked position, a piece good is permitted to move in a sliding direction onto the upper sliding surface, and movement of the piece good in the sliding direction onto the blocking element sliding surface is obstructed by the blocking edge; and moving the release device toward an enabled position comprising, raising the lifting and pre-stopping element such that the upper sliding surface is offset from the sliding plane and a stop of the lifting and pre-stopping element protrudes above the sliding plane, wherein, in the enabled position, the piece good exits the storage chute in the sliding direction via the blocking element sliding surface, and wherein moving the release device toward any of the blocked position and the enabled position comprises moving a movement converter comprising a three-armed section rotatable about an axis, the three-armed section comprising three arms, respectively coupled to (i) the lifting and pre-stopping element, (ii) a block of the blocking element, and (iii) a gear of the drive.

2. The method of claim 1, wherein moving the release device toward a blocked position comprises raising an extendable and retractable block of the blocking element, coupled to the drive, above a blocking element sliding surface.

3. The method of claim 1, wherein moving the release device toward an enabled position comprises lowering the block below the blocking element sliding surface.

4. The method of claim 3, wherein the block is lowered when the lifting and pre-stopping element is raised.

5. The method of claim 1, comprising monitoring exiting of the piece good with a delivery sensor.

6. The method of claim 1, wherein moving the movement converter comprises simultaneously moving the lifting and pre-stopping element and the block.

7. The method of claim 1, comprising, in the enabled position, obstructing a subsequent piece good from movement onto the upper sliding surface with the stop of the lifting and pre-stopping element.

8. The method of claim 1, comprising, after the piece good is delivered, moving the release device to the blocked position, wherein in the blocked position, a subsequent piece good is permitted to move in the sliding direction onto the upper sliding surface.

9. A method for delivering a piece good from an inclined storage chute, the method comprising:

moving a release device toward a blocked position comprising, moving a movement converter, comprising a three-armed section rotatable about an axis and comprising three arms, in a first direction, wherein one of the three arms of the three-armed section of the movement converter is coupled to a lifting and pre-stopping element and another of the three arms is coupled to an extendable and retractable block, wherein, in the blocked position, an upper sliding surface of the lifting and pre-stopping element is aligned with a sliding plane of the storage chute, a blocking edge of a blocking element protrudes above the sliding plane, and the block protrudes above a blocking element sliding surface; and moving the release device toward an enabled position comprising, moving the movement converter in a second direction, opposite the first direction, wherein, in the enabled position, the upper sliding surface is offset from the sliding plane, a stop of the lifting and pre-stopping element protrudes above the sliding plane, and the block is positioned below the blocking element sliding surface.

10. The method of claim 9, comprising monitoring exiting of the piece good with a delivery sensor.

11. The method of claim 9, wherein moving a movement converter in a first direction comprises lowering the lifting and pre-stopping element, and raising the block above the blocking element sliding surface.

12. The method of claim 9, wherein moving a movement converter in a second direction comprises raising the lifting and pre-stopping element, and lowering the block below the blocking element sliding surface.

13. The method of claim 9, wherein moving the movement converter in any of a first and second direction comprises moving the movement converter about the axis.

14. The method of claim 9, wherein moving the movement converter in any of a first and second direction comprises simultaneously moving the lifting and pre-stopping element and the block.

15. The method of claim 9, comprising, in the blocked position, obstructing movement of the piece good in a sliding direction onto the blocking element sliding surface by the blocking edge.

16. The method of claim 9, comprising, in the enabled position, permitting the piece good to exit the storage chute in the sliding direction via the blocking element sliding surface.

17. The method of claim 16, comprising, after the piece good is delivered, moving the release device to the blocked position, wherein in the blocked position, a subsequent piece good is permitted to move in a sliding direction onto the upper sliding surface.

18. The method of claim 9, comprising, in the enabled position, obstructing a subsequent piece good from movement onto the upper sliding surface with the stop of the lifting and pre-stopping element.

* * * * *